(12) United States Patent
Czipri

(10) Patent No.: US 9,789,931 B2
(45) Date of Patent: *Oct. 17, 2017

(54) COMBINATION FISHING POLE HOLDER AND CLEAT

(71) Applicant: R & D SHED, L.L.C., Clearwater, FL (US)

(72) Inventor: Bernd Czipri, Palm Harbor, FL (US)

(73) Assignee: R & D SHED, L.L.C., Clearwater, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/219,923

(22) Filed: Jul. 26, 2016

(65) Prior Publication Data

US 2016/0332701 A1 Nov. 17, 2016

Related U.S. Application Data

(63) Continuation of application No. 14/800,085, filed on Jul. 15, 2015, now Pat. No. 9,422,030.

(60) Provisional application No. 62/059,872, filed on Oct. 4, 2014.

(51) Int. Cl.
| | |
|---|---|
| *B63B 21/04* | (2006.01) |
| *B63B 17/00* | (2006.01) |
| *A01K 97/10* | (2006.01) |

(52) U.S. Cl.
CPC .............. *B63B 17/00* (2013.01); *A01K 97/10* (2013.01); *B63B 21/045* (2013.01); *B63B 2017/0054* (2013.01)

(58) Field of Classification Search
CPC ....... B63B 17/00; B63B 21/04; B63B 21/045; A01K 97/10

USPC .......................................... 114/218, 343, 364
See application file for complete search history.

(56) References Cited

U.S. PATENT DOCUMENTS

| | | | | |
|---|---|---|---|---|
| 3,870,259 | A | * | 3/1975 | Reynolds ............... A01K 97/10 248/539 |
| 5,312,077 | A | | 5/1994 | Gutierrez |
| 5,519,959 | A | | 5/1996 | Cross |
| 5,806,452 | A | | 9/1998 | Benoit |
| 5,987,804 | A | | 11/1999 | Shearer |
| 7,520,233 | B1 | | 4/2009 | Lyon |
| 8,286,572 | B1 | | 10/2012 | Picek |
| 2003/0230024 | A1 | | 12/2003 | Roberson |
| 2012/0280012 | A1 | * | 11/2012 | Crawford ............... B63B 17/00 224/406 |

* cited by examiner

*Primary Examiner* — Daniel V Venne
(74) *Attorney, Agent, or Firm* — Larson & Larson, P.A.; Frank Liebenow; Patrick Reid

(57) ABSTRACT

A combination fishing pole holder and cleat has a bezel portion for affixing to a surface. The bezel portion has a first hole for accepting an object and a shaped indentation to accept and fit a cleat portion. The bezel portion has a pair of studs, each having a cavity formed there within. The cleat portion is shaped to fit within the shaped indentation and has a second hole, also for accepting the object. A pair of legs extends from the cleat portion and through respective studs. Each of the legs is terminated by a device/end that is wider than the cavity of the studs. A tubular portion extends from a side of the bezel and is aligned with both the first hole and the second hole for insertion of the object. The cleat portion moves between a retracted position and an extended position.

20 Claims, 4 Drawing Sheets

COMBINATION FISHING POLE HOLDER AND CLEAT

CROSS-REFERENCE TO RELATED APPLICATION

This application is a continuation of U.S. patent application Ser. No. 14/800,085, filed Jul. 15, 2015, now U.S. Pat. No. 9,422,030 issued Aug. 23, 2016; which claims the benefit of U.S. provisional application No. 62/059,872 filed on Oct. 4, 2014, the disclosure of both are incorporated by reference.

FIELD

This invention relates to the field of marine equipment and more particularly to a device for holding a fishing pole and for attaching a line.

BACKGROUND

In many marine applications, vessels are often equipped with what are known as fishing pole holders. Although often used to hold objects other than fishing poles (e.g. gas grills), fishing pole holders are well known. Fishing pole holders typically have a bezel where the fishing pole holder is attached to the gunnels or other surface of a marine vehicle and a typically tubular extension that extends through the surface of the vessel, providing a typically tubular cavity into which a handle end of a fishing pole is inserted. The bezel is typically arranged to be substantially parallel to the vessel surface on which it is mounted while the tubular extension is typically at a non-right angle with respect to this vessel surface, thereby, when a fishing pole is inserted into the fishing pole holder, the fishing pole extends from the fishing pole holder at this non-90 degree angle, typically preferred by users.

Likewise, most marine vessels have at least one cleat to which a line (e.g. rope) is attached for anchoring, tying to other vessels, tying to a boat slip, etc. The typical cleat is fixed, usually made of metal such as stainless steel, and often has a bezel portion that attaches to a surface of the vessel and, extending there from, has a "pi" shaped (π) portion. The shape of the cleat allows for the line to be properly wrapped to securely fasten the line, being that tides, wind, and waves constantly work to try and undo the line.

Some newer cleats pop-up when needed, in that, when not in use, the "pi" shaped portion retracts and lays flush with the bezel portion, reducing snagging and tripping issues.

Unfortunately, the surfaces of the vessel where it is desirable for locating cleats is also desirable for locating fishing pole holders, for example, the port and starboard stern corners. This competition often results in cleats being mounted in the prime locations, being that the cleat is needed for proper docking, etc. The location of these cleats then dictates that the fishing pole holders must be located at sub-optimal locations.

Further, during manufacturing of vessels, having separate cleats and fishing pole holders requires additional labor for locating, drilling, installation, and fastening of two distinct devices, along with that associated probabilities of error.

What is needed is a combination fishing pole holder and cleat that solves this problem through co-locating both at the same location.

SUMMARY

In one embodiment, a combination fishing pole holder and cleat is disclosed having a bezel portion for affixing to a surface (e.g. a deck or gunnels of a boat). The bezel portion has a first hole for accepting an object and a shaped indentation, shaped to accept and fit a cleat portion. The bezel portion has a pair of studs, each of the studs having a cavity formed there within. The cleat portion is shaped to fit within the shaped indentation and has a second hole, also for accepting the object. A pair of legs extends from the cleat portion and through respective studs. Each of the legs is terminated by a device/end (e.g. a screw) that is wider than the cavity of the studs. A tubular portion extends from a side of the bezel opposite from the shaped indentation and the tubular portion is aligned with both the first hole and the second hole for insertion of the object. The cleat portion moves between a retracted position in which the cleat portion is contained within the shaped indentation and an extended position in which the legs extend from the respective studs and the cleat portion extends away from the bezel portion for affixing lines.

In another embodiment, a combination fishing pole holder and cleat is disclosed having a bezel portion for affixing to a surface (e.g., of a vessel). The bezel portion has a first hole for accepting an object and a shaped indentation. The shaped indentation is of size and shape as to accept and fit an outline of a cleat portion. The bezel portion also has a pair of studs, each of which have a cavity formed there within. In this, the outline of the cleat portion is shaped to fit within the shaped indentation. The cleat portion has a second hole, through which the object can pass. The cleat portion has a pair of legs, each of which extends from the cleat portion and through the cavities in respective studs. Each of the legs is terminated by an end device that is wider than the cavity of the studs, thereby preventing the legs from completely exiting the cavities in the respective studs. A tubular portion extends from a side of the bezel opposite from the shaped indentation. The cleat portion moves between a retracted position in which the cleat portion is contained within the shaped indentation; and an extended position in which the legs extend from the respective cavities within the studs and the cleat portion extends away from the bezel portion for affixing lines.

In another embodiment, a method of securing a boat to a dock is disclosed. The boat has a combination fishing pole holder and cleat as described. The method includes starting with the cleat portion being retracted such that the cleat portion rests within the shaped indentation of the bezel portion such that a face surface of the cleat portion is flush with a face surface of the bezel portion. Now, a butt end of a fishing pole is placed into the second hole such that the butt end of the fishing pole passing through the first hole and resting at least partially within the tubular portion. Next, the butt end of the fishing pole is removed from the second hole, the first hole and the tubular portion and the cleat portion is extended, out from the shaped indentation. Now, a first end of a line is tied onto the extended cleat portion with a second end of the line being secured to the dock.

In another embodiment, a combination fishing pole holder and cleat is disclosed having a bezel portion for affixing to a surface of a vessel. The bezel portion has a first hole substantially central to the bezel portion for accepting an object like a fishing pole, and the bezel portion has a pair of studs. Each of the studs has a cavity formed there within. The bezel portion has a shaped indentation that is of size and shape as to accept and fit an outline of a cleat portion. Likewise, the outline of the cleat portion is shaped to fit within the shaped indentation. The cleat portion has a second hole substantially central to the shaped indentation, and a pair of legs. Each of the legs extend from the cleat portion and through the cavities in respective studs. Each leg is terminated by an end device that is wider than the cavity of the studs, thereby preventing the legs from completely exiting the cavities in the studs. The cleat portion moves between a retracted position in which the cleat portion rests within the shaped indentation and an extended position in which the legs extend from the respective cavities within the studs and the cleat portion extends away from the bezel portion.

In another embodiment, a combination fishing pole holder and cleat is disclosed having a bezel portion for affixing to a surface. A first side of the bezel portion has a shaped indentation. A pair of studs extend from a second side of the bezel portion (opposing the first side); each of the studs having a cavity formed there within. A cleat portion has a pair of legs. Each of the legs extends from the cleat portion and into the cavities in respective studs. Each of the legs has a device that is wider than the cavity of the studs, thereby preventing each of the legs from completely exiting a respective cavity in the studs. The cleat portion is shaped to fit within the shaped indentation and a hole is formed in both the cleat portion and the bezel portion for supporting an object therein. The cleat portion moves between a retracted position in which the cleat portion is contained within the shaped indentation and an extended position in which the legs extend out of each respective cavity and the cleat portion remains distal from the bezel portion for affixing lines to the cleat portion In another embodiment, a method of securing a boat to a dock is disclosed. The boat has a combination fishing pole holder and cleat. A cleat portion of the combination fishing pole holder and cleat is extended such that the cleat portion extends outwardly from a shaped indentation of a bezel portion. The cleat portion has a pair of legs and each of the legs extend from the cleat portion into cavities in respective studs of the bezel portion. The bezel portion is affixed to a surface of the boat. The boat is secured to a dock by tying a first end of a line onto the cleat portion and a second end of the line is secured to the dock In another embodiment, a combination fishing pole holder and cleat is disclosed. The combination fishing pole holder and cleat has a bezel portion for affixing to a surface (e.g., the gunnel of a boat). A pair of studs extends from a first side of the bezel portion. Each of the studs has a cavity formed there within. A shaped indentation is formed on a second side of the bezel portion (opposing the first side). A cleat portion that sized and shaped to fit within a shaped indentation has a pair of legs that extend from the cleat portion and into the cavities of respective studs. A hole passes substantially central through the shaped indentation and the cleat portion (e.g. for holding a fishing pole). The cleat portion moves between a retracted position in which the cleat portion is substantially within the shaped indentation and an extended position in which the cleat portion rests extended away from the bezel portion for tying a line thereto.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
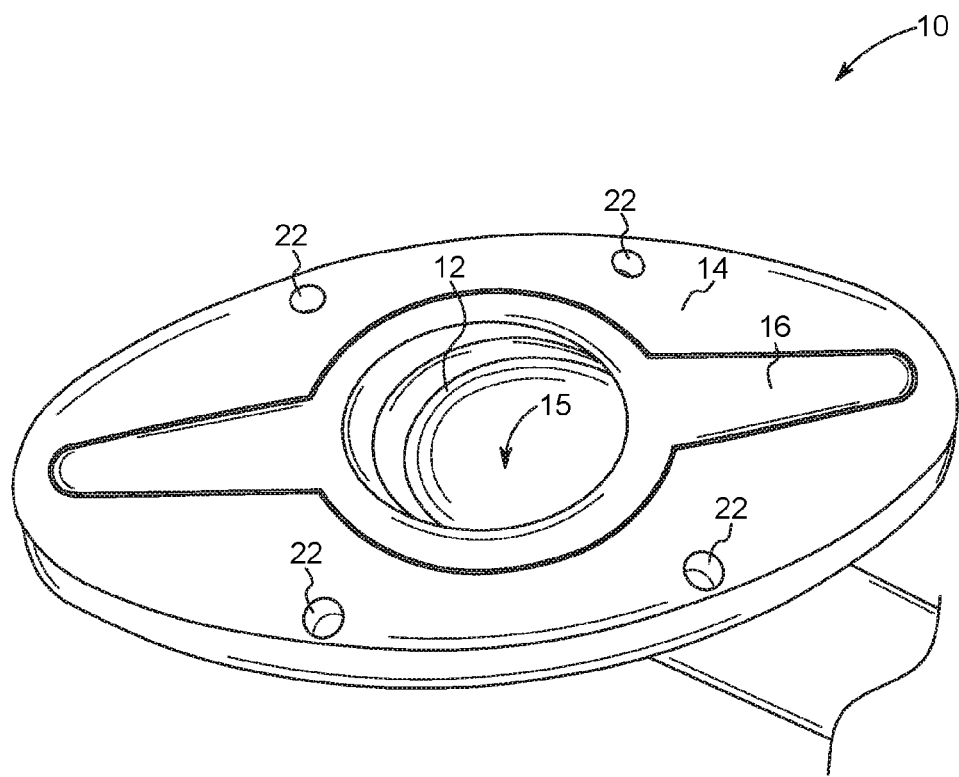
FIG. 1 illustrates a perspective view of a combination fishing pole holder and cleat with the cleat portion retracted (stowed).

Reference will now be made in detail to the presently preferred embodiments of the invention, examples of which are illustrated in the accompanying drawings. Throughout the following detailed description, the same reference numerals refer to the same elements in all figures.

Throughout this description, the term "cleat" is used to refer to a marine device that is typically mounted to a surface of a vessel and used for attaching a line. Such cleats are available in many sizes and shapes and are made of various materials. Likewise, the term "fishing pole holder" refers to any of a common set of devices attached or integrated into a surface of a vessel (e.g. boat) and used for any conceived purpose, one of which is to hold and support a fishing pole. Note that the typical fishing pole holder has a portion that typically extends below the surface of the vessel in which a portion of the supported object (e.g. fishing pole handle end) is inserted. The butt of the object typically extends far enough into the fishing pole holder as to physically retain the object within the fishing pole holder, usually at an angle that is other than 90 degrees with respect to the surface on which the fishing pole holder is located. There are other known types of fishing pole holders that affix externally to surfaces, as is typically mounted along the sternward surfaces of a top covering a center console of a center-console boat.

The term vessel will be used to refer to any watercraft or non-watercraft on which such objects are often mounted. For example, cleats are often mounted to docking surfaces, pilings, decks, etc.

Referring to FIG. 1, a perspective view of a combination fishing pole holder and cleat 10 is shown with the cleat portion retracted (stowed). In this mode, the combination fishing pole holder and cleat 10 is ready to accept a fishing pole (not shown) and is not ready for attaching a line (e.g. a rope, also not shown). The combination fishing pole holder and cleat 10 has a bezel portion 14 that typically lays substantially flush against a surface of the surface 30 of the vessel (see FIG. 4), and is typically affixed with fasteners (not shown) that pass through orifices/holes 22 (4 orifices/holes 22 are shown, though any number are anticipated).

The cleat portion 16 is shown retracted, snuggly fitting within a similar shaped outline 21 (see FIG. 3) within the bezel portion 14, preferably lying substantially flush with the bezel portion 14.

A tubular portion 12 extends from the bezel portion 14. When mounted on a surface 30, the tubular portion extends below the surface 30 and beneath the surface 30 of the vessel, providing a cavity 15 in which the handle-end of, for example, a fishing pole is inserted. Although the tubular portion 12 is shown as being cylindrical, there is no limitation on the size or shape of this portion 12 and, hence the cavity 15.

It is anticipated that the combination fishing pole holder and cleat 10 be made from any suitable material such as steel, stainless steel, plastic, nylon, etc.

Although not required, the holes 22 through the bezel are typically countersunk to allow heads of the fastening screws to sit flush or below an outer surface of the bezel portion 14.

Figure 2:
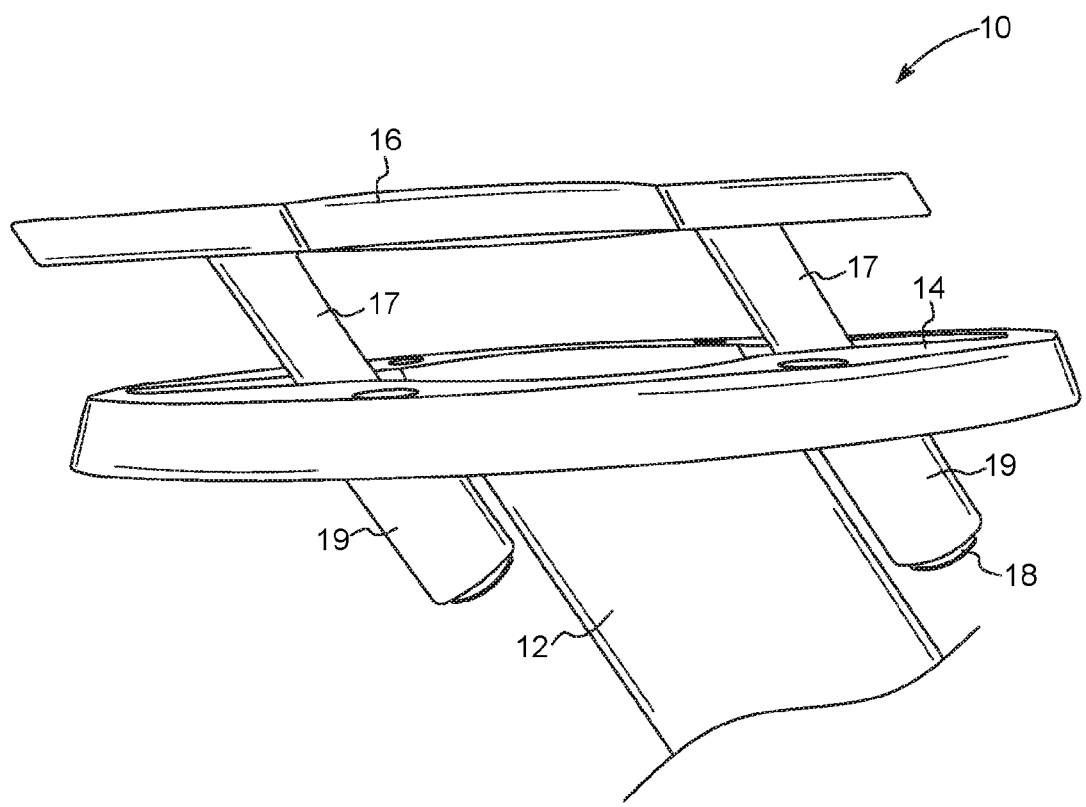
FIG. 2 illustrates a side perspective view of a combination fishing pole holder and cleat with the cleat portion extended (ready for attaching of a line).
Figure 3:
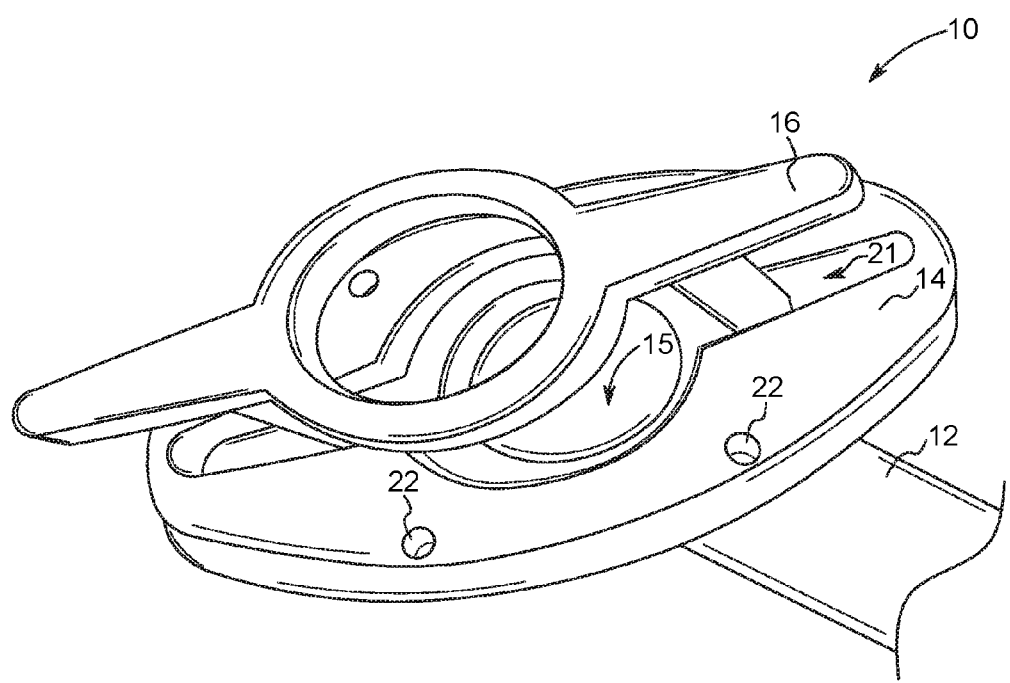
FIG. 3 illustrates a top perspective view of a combination fishing pole holder and cleat with the cleat portion extended (ready for attaching of a line)

Referring to FIGS. 2 and 3, perspective views of the combination fishing pole holder and cleat 10 are shown with the cleat portion extended (ready for attaching of a line—e.g., in a raised position). In this mode, the combination fishing pole holder and cleat 10 is ready to accept a line (e.g. a rope, also not shown). Note that, depending upon how the line is attached, the combination fishing pole holder and cleat 10 is often able to also accept an object such as a fishing pole, as long as the line doesn't block the cavity 15.

In this view, the angle of the tubular portion 12 is visible. Although any angle, including 90 degrees, is anticipated, it is desired that fishing poles, when inserted in fishing pole holders, including combination fishing pole holder and cleat 10, rest at an angle that is less than 90 degrees, angled toward the stern of the boat.

The cleat portion 16 is shown extended away from the bezel portion 14, and supported by two legs 17 that extend from mating cavities and extend through the bezel portion 14. The cavities (not visible) are formed within studs 19 of the bezel portion 14. The ends of the legs 17 are capped (e.g., with a screw and washer) to be larger than the diameter (or cross-sectional width) of the cavities by, for example, screws 18, such that, during manufacture, the legs 17 are inserted into the studs 19 and then the screws 18 are affixed to, for example, threads at the ends of the legs 17, thereby retaining the legs 17 within the cavities within the cavity within the studs 19, but allowing linear sliding of the legs 17 within the studs 19, for extension and retracting of the cleat potion 16.

In some embodiments, the cleat portion 16 is extended by pulling up on the cleat portion 16. In some embodiments, the cleat portion 16 is spring loaded (not shown), having a flip-flop-like device (not shown) for locking the cleat portion 16 in the retracted position. In such, pushing on the cleat portion 16 (towards the bezel portion 14), releases the lock and the cleat portion 16 pops up, then pushing the cleat portion 16 down, against the bezel portion 14, locks the cleat portion 16 in the retracted position until a future release by the same steps. In some embodiments, the cleat portion 16 remains extended by force of friction between the legs 17 and the cavities within the studs 19. In such, this friction serves to maintain the cleat portion 16 in either the retracted position (as in FIG. 1) or the extended position (as in FIGS. 2-4) until the cleat portion 16 acted upon by a pulling or pushing force sufficient to overcome the friction. In some embodiments, one or both studs 19 have a spring that urges a ball or other protrusion (not shown) towards the respective leg 17 such that, the ball or other protrusion enters a detent or depression (not shown) in the respective leg 17 when the cleat portion 16 is in the extended position, thereby maintaining the cleat portion 16 in the extended position until sufficient force is exerted against the cleat portion 16 to move the detent beyond the ball or other protrusion.

In some embodiments, the bezel portion 14 has one or more finger pull areas (not shown) around where the cleat portion 16 rests to allow a finger of a user to grasp the cleat portion 16 when moving the cleat portion 16 from the retracted position. Likewise, in some of such embodiments, the cleat portion 16 is also chamfered in the area near the finger pull areas to allow the fingers to get under a surface of the cleat portion 16 to facilitate overcoming, for example, the friction between the legs 17 and the cavities within the studs 19.

A tubular portion 12 extend preferably extends from the bezel portion 14. When mounted on a surface 30 of the vessel, the tubular portion 12 and the studs 19 extend through the surface 30 of the vessel and typically the tubular portion 12 extends far enough through the surface 30 of the vessel to capture an end of, for example, a fishing pole to support the fishing pole, even when the vessel is under way. The tubular portion 12 provides a cavity 15 in which the handle-end of, for example, a fishing pole is inserted. Although the tubular portion 12 (and cavity 15) is shown as being cylindrical having a substantially circular cross section, there is no limitation on the size or shape of this tubular portion 12 and, hence the cavity 15.

Figure 4:
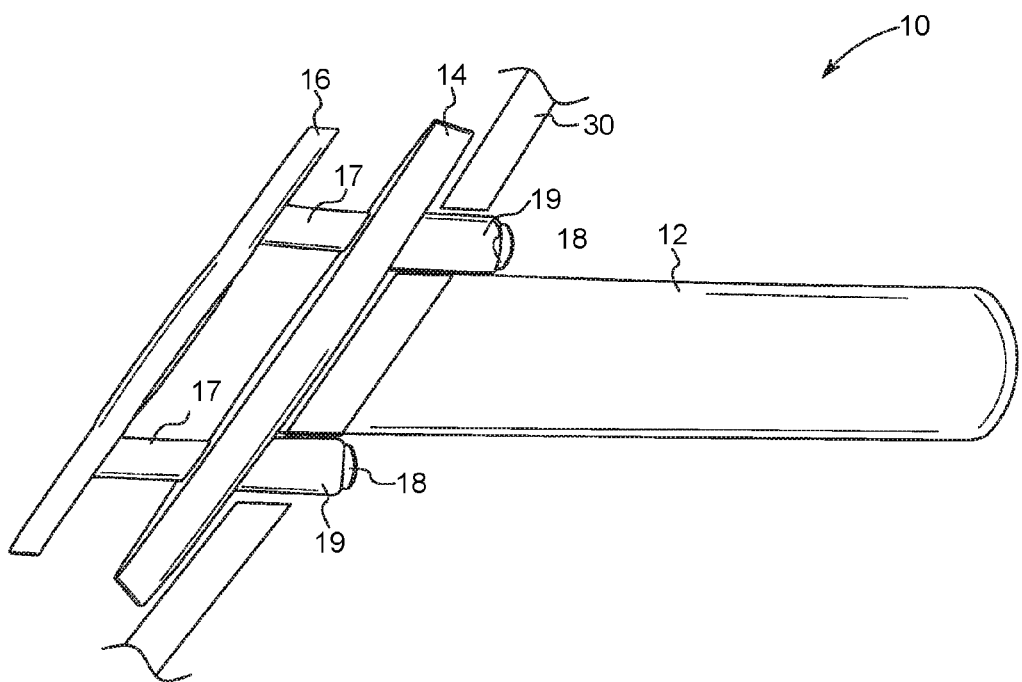
FIG. 4 illustrates a perspective view of a combination fishing pole holder and cleat with the cleat portion extended also showing the boat deck.

Referring to FIG. 4, a perspective view of a combination fishing pole holder and cleat 10 is shown with the cleat portion 16 extended also showing a portion of the surface 30 of the vessel (e.g. gunnels of boat, deck of boat, etc.). In a preferred embodiment, the tubular portion 12 is at an acute angle with respect to the surface 30 (acute with respect to the direction of the bow of the vessel of which the surface 30 is part thereof). In this manner, a fishing pole (not shown) inserted into the cavity 15 rests at a similar acute angle with respect to the surface 30, angled out toward the stern of the boat. The tubular portion 12 extends a certain distance below the surface 30, deep enough to support the object (e.g. fishing pole) at this substantially similar angle (e.g., it is anticipated that the handle end of the exemplary fishing pole has a smaller outer diameter than an inner diameter of the tubular portion, and therefore, this fishing pole will rest at a more acute angle than the acute angle of the tubular portion 12).

There is no limit to the length or shape of the tubular portion 12, yielding to typical marine dimensions. Note that, in some embodiments, both ends of the tubular portion 12 are open, allowing fluids to drain out of the bottom of the tubular portion 12 and into the bilge of the vessel in which it is mounted, which is typically later removed by a bilge pump.

Also note that the angles at which the legs 17 meet the cleat portion 16, and the angles at which the studs 19 meet the bezel portion 14 are similar to the acute angle of the tubular portion 12 with respect to the bezel portion 14. These angles are not limited, but by having similar angles, the hole in the cleat portion 16 maintains alignment with the tubular portion 12 when extended (as in FIG. 4) and, therefore, it is possible for an object such as a fishing pole butt to be inserted into the combination fishing pole holder and cleat 10 while the cleat portion 16 is extended. It is also possible that the legs 17 and studs 19 be at different angles (e.g. at a 90 degree angle with respect to the bezel portion 14 and the surface 30). It is anticipated that in embodiments in which the angle differs, the differences in this angle will limit the use of the combination fishing pole holder and cleat 10 as a fishing pole holder while the cleat portion 16 is extended.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A combination fishing pole holder and cleat comprising:
 a bezel portion for affixing to a surface, a first side of the bezel portion having a shaped indentation;
 a pair of studs extending from a second side of the bezel portion, the second side opposing the first side, each of the studs having a cavity formed there within;
 a cleat portion, the cleat portion having a pair of legs, each of the legs extending from the cleat portion and through the cavities in respective studs;
 whereas the cleat portion is shaped to fit within the shaped indentation, and whereas a hole is formed in both the cleat portion and the bezel portion, the hole is for supporting an object therein; and
 wherein the cleat portion moves between a retracted position in which the cleat portion is contained within the shaped indentation and an extended position in which the legs extend out of each respective cavity and the cleat portion remains distal from the bezel portion for affixing lines to the cleat portion.

2. The combination fishing pole holder and cleat of claim 1, further comprising a tubular portion extending from the hole on the second side of the bezel.

3. The combination fishing pole holder and cleat of claim 1, wherein each of the legs are held within the respective cavity by a device that is wider than the cavity of the studs, thereby preventing each of the legs from completely exiting a respective cavity in the studs.

4. The combination fishing pole holder and cleat of claim 3, wherein the device is a screw and a washer, the washer having an outer diameter that is at least greater than an inner diameter of the cavity in the respective studs.

5. The combination fishing pole holder and cleat of claim 1, wherein the object is a fishing pole.

6. The combination fishing pole holder and cleat of claim 1, wherein the bezel and the cleat portion are made from stainless steel.

7. The combination fishing pole holder and cleat of claim 1, wherein the hole and the tubular portion have substantially circular cross sectional shape.

8. The combination fishing pole holder and cleat of claim 1, wherein the hole is substantially central to the bezel portion and the cleat portion.

9. The combination fishing pole holder and cleat of claim 1, wherein the cleat portion is raised by pulling on the cleat portion to lift the legs out of the cavities in respective studs, thereby overcoming friction between an outer surface of the legs and an inner surface of the cavities in respective studs.

10. A method of securing a boat to a dock, the boat having a combination fishing pole holder and cleat, the method comprising:
 extending a cleat portion of the combination fishing pole holder and cleat such that the cleat portion extends outwardly from a shaped indentation of a bezel portion, the cleat portion having a pair of legs, each of the legs extending from the cleat portion and into cavities in respective studs of the bezel portion; the bezel portion affixed to a surface of the boat;
 tying a first end of a line onto the cleat portion, a second end of the line secured to the dock.

11. The method of claim 10, further comprising:
 removing the first end of the line from the cleat portion; and
 pushing the cleat portion into the shaped indentation such that the cleat portion rests within the shaped indentation of the bezel portion and such that the face surface of the cleat portion is substantially flush with a face surface of the bezel portion.

12. The method of claim 11, further comprising:
 inserting an end of a fishing pole into a hole formed through both the cleat portion and the bezel portion for holding the fishing pole.

13. A combination fishing pole holder and cleat comprising:
 a bezel portion for affixing to a surface;
 a pair of studs extending from a first side of the bezel portion, each of the studs having a cavity formed there within;
 a shaped indentation formed on a second side of the bezel portion, the second side opposing the first side;
 a cleat portion sized and shaped to fit within a shaped indentation of the bezel portion, the cleat portion having a pair of legs, each of the legs extending from the cleat portion and into the cavities of respective studs; and
 a hole passing substantially central through the shaped indentation and the cleat portion;
 wherein the cleat portion moves between a retracted position in which the cleat portion is substantially within the shaped indentation and an extended position in which the cleat portion rests extended away from the bezel portion for tying a line thereto.

14. The combination fishing pole holder and cleat of claim 13, wherein each of the legs has a stop device that is wider than the cavity of the studs, thereby preventing the legs from completely exiting the cavity in the respective studs.

15. The combination fishing pole holder and cleat of claim 13, further comprising a tubular portion interfaced to the hole and extending from the second side of the bezel.

16. The combination fishing pole holder and cleat of claim 13, wherein the hole is sized large enough to accept a butt end of a fishing pole.

17. The combination fishing pole holder and cleat of claim 13, wherein the bezel and the cleat portion are made from stainless steel.

18. The combination fishing pole holder and cleat of claim 13, wherein the bezel and the cleat portion are made from nylon.

19. The combination fishing pole holder and cleat of claim 13, wherein the hole and the tubular portion have substantially circular cross sectional shapes.

20. The combination fishing pole holder and cleat of claim 13, wherein the cleat portion is raised by pulling on the cleat portion to lift the legs out of the cavities in respective studs, thereby overcoming friction between an outer surface of the legs and an inner surface of the cavities in respective studs.

* * * * *